(12) United States Patent
Blake

(10) Patent No.: US 6,380,483 B1
(45) Date of Patent: Apr. 30, 2002

(54) CONNECTOR FOR FLEXIBLE ELECTRICAL CONDUIT

(75) Inventor: Geoffrey Blake, Sharon, MA (US)

(73) Assignee: IBC Corporation, South Easton, MA (US)

( * ) Notice: Subject to any disclaimer, the term of this patent is extended or adjusted under 35 U.S.C. 154(b) by 0 days.

(21) Appl. No.: 09/511,280

(22) Filed: Feb. 23, 2000

Related U.S. Application Data

(60) Provisional application No. 60/123,289, filed on Mar. 8, 1999.

(51) Int. Cl.[7] ................................................ H02G 3/18
(52) U.S. Cl. ................. 174/65 R; 174/65 G; 174/135; 248/56; 16/2.1; 439/98
(58) Field of Search ............................ 174/65 R, 65 SS, 174/65 G, 151, 135, 152 G, 153 G; 248/56; 16/2.1, 2.2; 439/98, 95, 96, 544, 567, 548; 285/194, 162

(56) References Cited

U.S. PATENT DOCUMENTS

| | | | |
|---|---|---|---|
| 4,012,578 A | 3/1977 | Moran et al. | 174/51 |
| 4,021,604 A | 5/1977 | Dola et al. | 174/51 |
| 4,366,344 A | 12/1982 | Sheehan | 174/65 R |
| 4,616,105 A * | 10/1986 | Borsh | 174/65 R |
| 4,619,332 A | 10/1986 | Sheehan | 174/65 R |
| 4,880,387 A | 11/1989 | Stikeleather et al. | 439/98 |
| 4,990,721 A | 2/1991 | Sheehan | 174/65 R |
| 5,422,437 A * | 6/1995 | Schnell | 174/65 R |
| 5,811,728 A * | 9/1998 | Maeda | 174/65 R |
| 6,025,557 A * | 2/2000 | Daoud | 174/65 G |
| 6,034,326 A | 3/2000 | Jorgensen | 174/65 R |
| 6,064,004 A * | 5/2000 | Kunnas | 174/65 G |

FOREIGN PATENT DOCUMENTS

GB 2041661 * 9/1980 ............... 174/65 R

* cited by examiner

Primary Examiner—Dean A. Reichard
Assistant Examiner—Dhiru R Patel
(74) Attorney, Agent, or Firm—Grossman, Tucker, Perreault & Pfleger, PLLC

(57) ABSTRACT

A one-piece, flexible conduit connector for connecting an electrical conduit having a helically grooved outer metal sheath to an electrical junction box, the connector being generally cylindrical to conform roughly with the sheath of the conduit and having a central opening through which insulated wires extend from said conduit, an anti-short flange being formed by hemming the central opening, inwardly projecting barbs being formed on the walls of the connector to engage the conduit and the outer diameter of the connector being of appropriate size for insertion into the junction box wall opening.

3 Claims, 2 Drawing Sheets

CONNECTOR FOR FLEXIBLE ELECTRICAL CONDUIT

This Appln claims benefit of Prov. No. 60/123,289 filed Mar. 8, 1999.

BACKGROUND OF THE INVENTION

The present invention relates to a connector by which helically grooved electrical conduit can be rigidly secured in a housing such as a junction box, fixture or the like.

The problem of securely fastening flexible electrical conduit in a junction box has been solved in several ways in the past. One such solution involves die cast sleeves which are threaded into the opening in the junction box and then secured by a locking nut. Conduit is then fed through the sleeves and clamped by screw-tightening a bar assembly to bear upon the inserted conduit. While this method serves the ultimate purpose of holding the electrical conduit in the junction box, it has several drawbacks.

Connectors involving die cast sleeve assemblies typically have several separate subparts which are manufactured and then loosely assembled and sold as a connector unit. Individual assembled units must then be dissembled for installation at the worksite. Such a complicated manufacturing and installation technique is very expensive and time-consuming. Also, junction boxes of the type in which the connectors of the present invention are designed for use are often located in out-of-the-way places to which access is limited. Die cast sleeve assemblies have proven difficult to use where needed because the numerous small parts require ample space and a dexterous hand to assemble and fix in position in the junction box. Finally, die cast assemblies by their very nature tend to be somewhat weighty and costly.

In U.S. Pat. No. 4,012,578, a connector clip is described which has a "body portion generally defined by flat walls". The body portion rather than being cylindrical as in the patent discussed above has a triangular, square, pentagonal, or hexagonal cross-section, the flat walls assertedly better engaging the conduit outer surface. In practice, however, the patented device fails to engage the conduit evenly and the conductor is only loosely connected to the junction box, remaining subject to unwanted disengagement.

Incorporated herein by reference is the disclosure of U.S. Pat. No. 4,880,387, which is assigned to the same assignee as is the present invention and application. There is disclosed a one-piece connector which solves many of the foregoing problems, particularly when used for smaller conduit. The patented connector achieved its good results largely through the use of multiple gripping barbs formed on flexible arms which engage the conduit over relatively broad areas. Also, relatively long retaining members cooperate with flanges to lock the connector into the opening of a junction box or other housing.

A need has arisen for even better performance, especially with the majority of conduit being installed in openings of ⅞" (standard knock-out hole), and the primary object of this invention is to fill that need.

SUMMARY OF THE INVENTION

In the present invention, a more rugged barb design for engaging the conduit provides increased resistance to the conduit being pulled out of the connector. Also, by the use of multiple flexible arms, the resistance of the connector to pullout from the junction box opening has been increased. The multiple flexible arms also contribute to the radial stability against side forces on the conduit when it is engaged in the junction box opening. Lastly, an additional flexible arm engages the outside diameter of the conduit, increasing the resistance against unscrewing.

For a better understanding of the present invention, together with other and further objects, features and advantages, reference should be made to the following description of a preferred embodiment which should be read with reference to the appended drawing in which:

DESCRIPTION OF PREFERRED EMBODIMENT

The one-piece flexible conduit connector of this invention is made of relatively resilient metal formed into a thimble of conical shape and having barbs projecting inwardly from certain areas of the walls of the thimble to engage the helical groove of a conduit sheath. The conduit sheath may be threaded into the connector which in turn is inserted in an opening in a junction box or other fixture.

Figure 1:
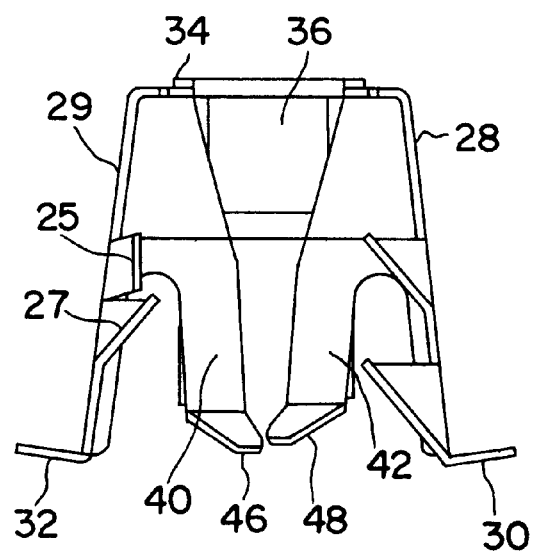
FIG. 1 is a front elevation in outline of a flexible conduit connector in accordance with the present invention.
Figure 2:
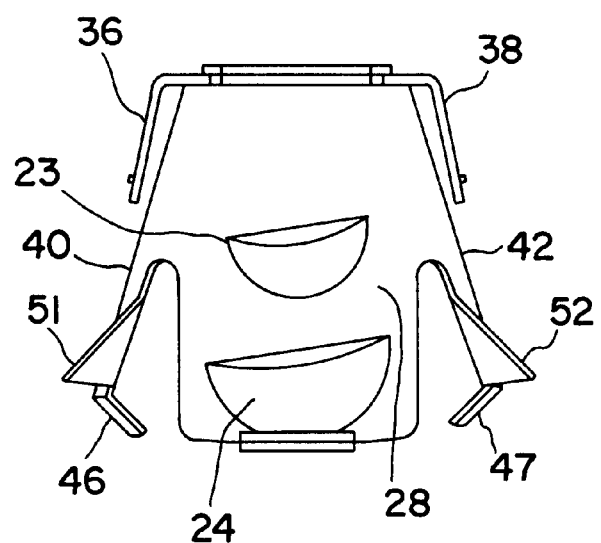
FIG. 2 is a side elevation similar to but rotated from that of FIG. 1.
Figure 3:
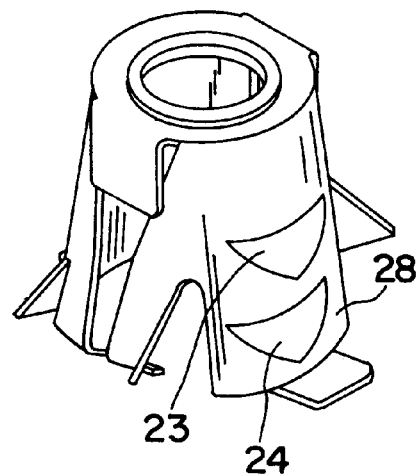
FIG. 3 is a view in perspective of a connector in accordance with the invention.
Figure 4:
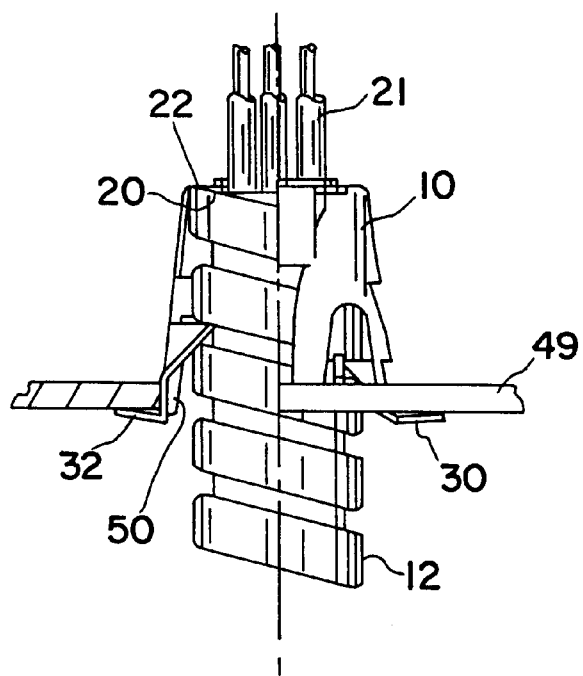
FIG. 4 is a view partly in section of a connector in place on a conduit and inserted into the opening of a junction box.

In FIGS. 1 and 2 outline sketches of a connector are shown, and in FIG. 3 there is shown a perspective view of the device. Finally, FIG. 4 of the drawing illustrates a connector 10 is threaded onto the end of helically grooved electrical conduit 12 until the end of the conduit sheath 20 abuts the underside of a connector face portion 22. The threading action is guided by barbs best seen in FIGS. 2 and 3, barbs 23 and 24 being punched in half-moon shapes in arcuate wall 28. The barbs are oriented at the proper angle to engage the helical groove. On another arcuate wall 29 of the connector opposite the barbs 23 and 24, an additional barb 25 is formed by a generally rectangular punch, also having an orientation matching that of the helical groove. Beneath the barb 25, a barb 27 is formed by means of a triangular punch, the opening formed by the triangular punch intersecting that of the rectangular punch of the barb 25. The walls 28 and 29 are sized and shaped to conform roughly with the cylindrical sheath 20 of the conduit 12. The wall 28 terminates in an outwardly projecting flange 30 and the wall 29 terminates in a similar flange 32.

At the top of the connector, the face portion includes an anti-short ring 34, which may be formed by "hemming" over the edge of a generally circular central top opening. Tongue members 36 and 38 depend from diametrically opposite areas of the ring 34. Between the arcuate walls 28 and 29, open areas exist at opposite sides of the connector, and it is into these areas that the tongue members 36 and 38 extend. Adjacent either side of the tongue member 36 are downwardly depending arms 40 and 42. Each of the arms 40 and 42 has an inwardly directed tip 46 and 48, respectively. Similar structure exists adjacent the tongue member 38, the top 47 being visible in FIG. 2.

Installation of the connectors is achieved by first cutting the sheath 20 in such a fashion that electrical wires 21 extend outwardly for several inches. The connector is threaded onto the conduit sheath 20 with the electrical wires 21 extending through the circular opening through the anti-short ring 34.

After the connector is threaded onto the conduit, the connector may be inserted in an opening 50 formed in a wall of the junction box 49 or other fixture as shown fragmentarily. The arcuate walls 28 and 29 partially define a circle along the conical surface having a diameter slightly larger than that of the opening 50 in the wall of the junction box 49. As a result, when the connector is inserted through the opening 50, the flexible arcuate walls 28 and 29 are pinched together and the various inwardly projecting barbs 23, 24, 25 and 27 engage the sheath 20 of the conduit 12. The tips 46 and 48 on the arms 40 and 42 project inwardly, tending to keep the conduit 12 central in the opening 50. The arms 40 and 42 also normally flare outwardly and are suitably dimensioned to be deflected inwardly by the wall of the opening 50 of the junction box 49 when the connector is inserted. The flanges 30 and 32 extend substantially beyond the opening 50 in the junction box wall 49. When the connector is inserted into the junction box opening 50, the surfaces of the flanges 30 and 32 contact the bottom surface of the wall 49, limiting the penetration of the connector in the junction box. Also, the resilience of the arcuate walls is sufficient for the arms to give slightly. The junction box wall 49 becomes clamped between the barbs 51 and 52 and the flange members 30 and 32.

Good electrical and mechanical contact between the connector 10 and the conduit 12 is assured by the inwardly projecting barbs. Moreover, the relatively rugged barb construction, particularly as exhibited by the half-moon punches 23, increases the resistance of the conduit to being pulled from the connector. Also, the multiple flexible arms 40 and 42 increase the resistance of the connector to pull out from the opening 50. Increased radial stability with respect to side forces is achieved through the use of four flexible arms. Finally, the geometries of the barbs increase the resistance of the conduit from unscrewing from the connector.

What is claimed is:

1. A one-piece, flexible conduit connector for connecting an electrical conduit having a helical groove in an outer metal sheath and electrical wires within said sheath, to an electrical junction box having an opening formed in a wall thereof, said connector including:

a circular face portion having a round opening formed therethrough;

an anti-short ring surrounding said opening and projecting outwardly from a front surface of said face portion, said front surface of said face portion facing into said junction box;

a pair of tongue members depending from opposite sides of said face portion, a pair of flexible walls depending from said opposite sides of said face portion between said tongue members, said flexible walls being opposite to each other around the circumference of said face portion and arcuately shaped to conform to said electrical conduit;

a plurality of barbs formed on said flexible walls and positioned to engage said helical groove over a plurality of turns of said helical groove when said electrical conduit is screwed into said connector, said barbs having pointed ends engaging the surface of said helical groove so as to place said sheath and said junction box in good electrical contact with each other and to prevent said electrical conduit from being either pulled from or backthreaded out of said connector;

a flange extending outwardly from an end of each of said flexible walls at an angle thereto so as to abut against the outer surface of said junction box wall and limit the insertion of said connector in said junction box wall opening;

and two pairs of retaining arms normally flaring out from said flexible walls, each of said two pairs of retaining arms having an inwardly directed tip and being deflectable inwardly to allow said connector to be inserted into said junction box wall opening.

2. A one-piece flexible conduit connector as defined in claim 1 wherein said electrical wires comprise a plurality of insulated wires extending from said electrical conduit and said anti-short ring is formed by hemming said round opening, said insulated wires passing through said round opening.

3. A one-piece, flexible conduit connector as defined in claim 1 wherein said plurality of barbs includes at least one pair of half-moon punched portions of said flexible walls.

* * * * *